United States Patent
Buican et al.

(10) Patent No.: US 6,373,690 B1
(45) Date of Patent: Apr. 16, 2002

(54) APPARATUS FOR MOUNTING A PANEL TO A CHASSIS OF A COMPUTER

(75) Inventors: Eugene Buican; Greg George, both of Austin, TX (US)

(73) Assignee: Dell USA, L.P., Round Rock, TX (US)

(*) Notice: Subject to any disclaimer, the term of this patent is extended or adjusted under 35 U.S.C. 154(b) by 0 days.

(21) Appl. No.: 09/422,903

(22) Filed: Oct. 21, 1999

(51) Int. Cl.⁷ .................................................. G06F 1/16
(52) U.S. Cl. .................. 361/683; 361/679; 361/780; 361/681; 361/682; 361/683; 292/80; 292/81; 292/83; 292/87; 292/91; 16/223; 16/327; 16/328; 16/331
(58) Field of Search ............................. 292/80, 81, 83, 292/91, 87; 361/679, 683; 16/223, 327, 328, 331

(56) References Cited

U.S. PATENT DOCUMENTS

| | | |
|---|---|---|
| 3,671,065 A | 6/1972 | Bingham |
| 4,679,368 A | 7/1987 | Pettinga et al. |
| 4,974,740 A | 12/1990 | Niles et al. |
| 4,993,758 A | 2/1991 | Schmutzler |
| 5,031,070 A | 7/1991 | Hsu |
| 5,348,356 A * | 9/1994 | Moulton ................... 292/80 |
| 5,593,220 A | 1/1997 | Seid et al. |
| 5,713,647 A | 2/1998 | Kim |
| 5,751,545 A | 5/1998 | Jung |
| 5,820,235 A | 10/1998 | Tsai |
| 5,823,644 A | 10/1998 | Suh et al. |
| 5,826,922 A | 10/1998 | Wernig |
| 5,882,052 A | 3/1999 | Whitehead |
| 6,034,867 A * | 3/2000 | Seo ........................ 361/683 |

* cited by examiner

*Primary Examiner*—Leo P. Picard
*Assistant Examiner*—Yeah-Hsi Chang
(74) *Attorney, Agent, or Firm*—Haynes and Boone, LLP

(57) ABSTRACT

An apparatus for mounting a panel to a chassis of a computer. The apparatus includes a release member movably mounted on a top surface of the chassis and a flange fixedly mounted to a base portion of the chassis. The release member is movable between a static position and a release position. A panel is pivotally attached adjacent to a base portion of the chassis. The panel is movable between a closed position and an open position. A resilient retention member is attached to the panel. The retention member is engaged with the flange when the panel is in the closed position. The release member resiliently deflects the retention member from engagement with the flange when the release member is moved from the static position toward the release position to allow the panel to be moved from the closed position to the open position. The panel can be accurately and consistently aligned and attached to the chassis of the computer system after each removal. Furthermore, the panel can be quickly and easily engaged and disengaged with minimal force without the use of tools or having to manipulate fasteners such as screws.

19 Claims, 6 Drawing Sheets

APPARATUS FOR MOUNTING A PANEL TO A CHASSIS OF A COMPUTER

BACKGROUND

The disclosures herein relate generally to computer systems and more particularly to an apparatus for mounting a panel to a chassis of a computer.

A computer system such as a desktop personal computer typically includes a chassis made of a metal material. To provide for an aesthetically pleasing appearance and for various functional purposes, a variety of plastic panels are used to cover portions of the chassis. Typically, the top, sides and front of the chassis are substantially covered by plastic panels. The front is typically covered with a bezel panel. The sides are generally covered with side panels. One of the side panels is usually removable and one may be stationary. The removable side panel is intended to provide relatively easy access to the system components mounted within the chassis. The top of the chassis is generally covered with a top panel. However, in some computer designs, the top panel and at least one of the side panels is integrally formed.

Some panels are mounted with panel mounting systems that make the panels difficult to remove and reinstall. This includes systems that utilize a sliding panel configuration. The ease by which the panel can be removed and reinstalled is adversely affected by interference between the chassis and the panels. Other panel mounting systems utilize a detachable clip configuration that allows the panel to be unhooked from the chassis and then lifted out of the way. The detachable clips are susceptible to breakage and require precise alignment to properly reinstall the panel.

U.S. Pat. No. 5,826,922 discloses a rotary latch assembly which allows for the attachment of a computer bezel to a computer housing. Latches disposed on each side of the bezel engage openings in the computer housing so as to secure the bezel to the computer housing. The latches are attached to rails which include gears. A knob which includes rotary gears extends through an opening in the bezel. The rotary gears engage the gears of both of the rails such that the latches may be moved within a limited range by rotating the knob. Thus, the bezel may be removed by rotating the knob such that the latches move inward, thereby disengaging the latches from the openings in the computer housing.

U.S. Pat. No. 5,820,235 discloses a front panel assembly for attachment to a mainframe of a computer. The panel assembly includes a base frame having two longitudinal sliding grooves bilaterally disposed at the front side, and a bottom cover on the lower half of the base frame including an air filter. A gear holder is mounted on the base frame and holds a gear. A dust cover is mounted on the base frame and moves along the longitudinal sliding grooves between closed and open positions. The dust cover has a longitudinal rack meshed with the gear and a locating hole at the back near the top. A latch on the base frame is forced by a spring into engagement with the locating hole of the dust guard to lock the dust guard in the closed position, and a spring-supported button on the base frame is controlled to release the latch from the locating hole of the dust guard.

U.S. Pat. No. 5,751,545 discloses a chassis of a desktop personal computer where the cover can be assembled onto or removed from the base by a user without the use of screws or tools. This allows the user to gain easy access to the electrical components inside the chassis. The design of the base and the cover incorporates a set of guide pins to be inserted into a corresponding set of guide holes in order to properly position the cover onto the base. The cover is fastened to the base by rotating a buckle pivotally attached to the cover so that it engages the base. Finally, a slidable detent located on the cover can be slid onto the buckle, preventing the buckle from inadvertently becoming unfastened. To disassemble the cover from the base, the process is reversed. First, the detent is slid off the buckle, allowing the buckle to rotate. Next, the buckle is disengaged from the base by pivoting it open. Finally, the cover is removed from the base by sliding the cover off the base while extracting the guide pins from the guide pin holes.

U.S. Pat. No. 5,713,647 discloses a computer case that allows a user to open and close the case without the use of special tools or screws. A user slides two sliders on the cover of the case toward each other and lifts up the front portion of the cover to gain access to the interior of the case. The slider is monolithically integrated with a latch. The latch contains two spaced-apart arms and a recess. One of the arms of the latch is arcuate for guiding a portion of the base and a portion of a cover into the recess so that both portions are mated for preventing inadvertent opening of the case. This mating can be accomplished by sliding a pair of sliders in the appropriate directions. To disengage the cover from the base, the sliders are actuated to move a portion of the base from contact with a portion of the cover. When the case is released, the front of the cover can be lifted up. A pair of hinges in the rear of the case allows the front of the case to be pivoted open while preventing the cover from being completely detached from the base.

In many instances, the panels are not properly positioned when they are reinstalled. As a result, the intended electromagnetic interference (EMI) protection is reduced and the panels cannot be locked in place. Furthermore, for ergonomic and marketing reasons, removal of the various panels for accessing the system components should not be an undesirable experience for the computer user.

Bezel panels often have openings through them for providing access to peripheral devices such as a floppy disk drive or compact disk drive that are attached to the chassis beneath the bezel panel. To ensure that each opening in the bezel is accurately aligned with the corresponding peripheral device, the bezel panel must be properly aligned to the chassis. In addition to electromagnetic emission considerations, misalignment of the bezel panel with respect to the chassis may complicate or preclude access to the peripheral devices under the bezel.

Accordingly, there is a need for a cost-effective mounting system that allows panels to be easily and reliable installed on and removed from the chassis of a computer system.

SUMMARY

One embodiment, accordingly, provides a mounting system that allows a panel to be removably attached to the chassis of a computer system. To this end, one embodiment provides an apparatus for mounting a panel to a computer chassis. The apparatus includes a release member movably mounted on the chassis and a flange attached to the chassis. The release member is movable between a static position and a release position. A panel is pivotally attached to the chassis. The panel is movable between a closed position and an open position. A resilient retention member is attached to the panel. The retention member is engaged with the flange when the panel is in the closed position. The release member deflects the retention member from engagement with the flange when the release member is moved from the static position toward the release position to allow the panel to be moved from the closed position to the open position.

A principal advantage is that the panel may be accurately and repeatedly aligned and attached to the chassis of the computer system.

BRIEF DESCRIPTION OF THE DRAWING FIGURES

DETAILED DESCRIPTION

Figure 1:
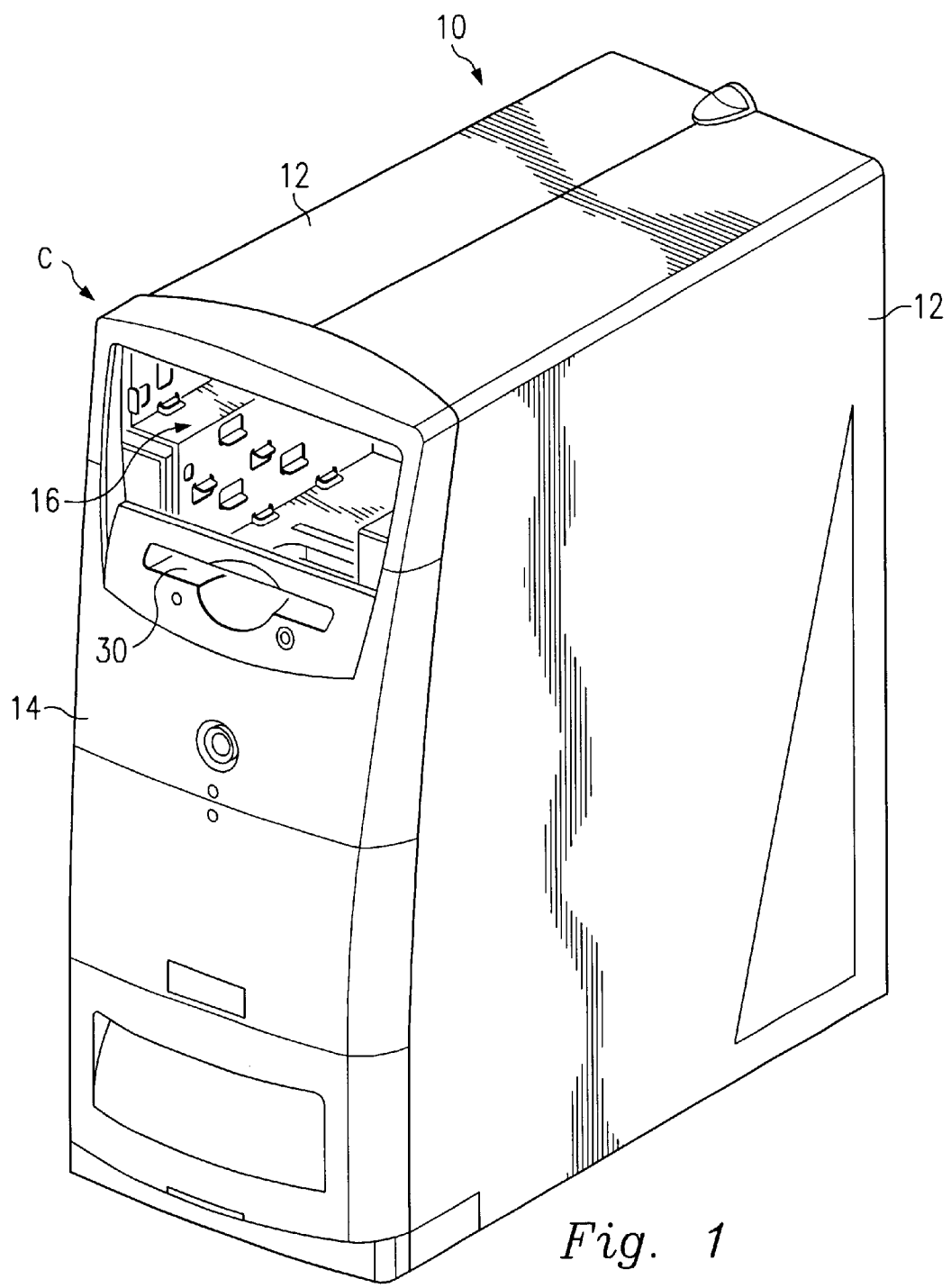
FIG. 1 is perspective view illustrating an embodiment of a computer with a bezel panel in a closed position.
Figure 2:
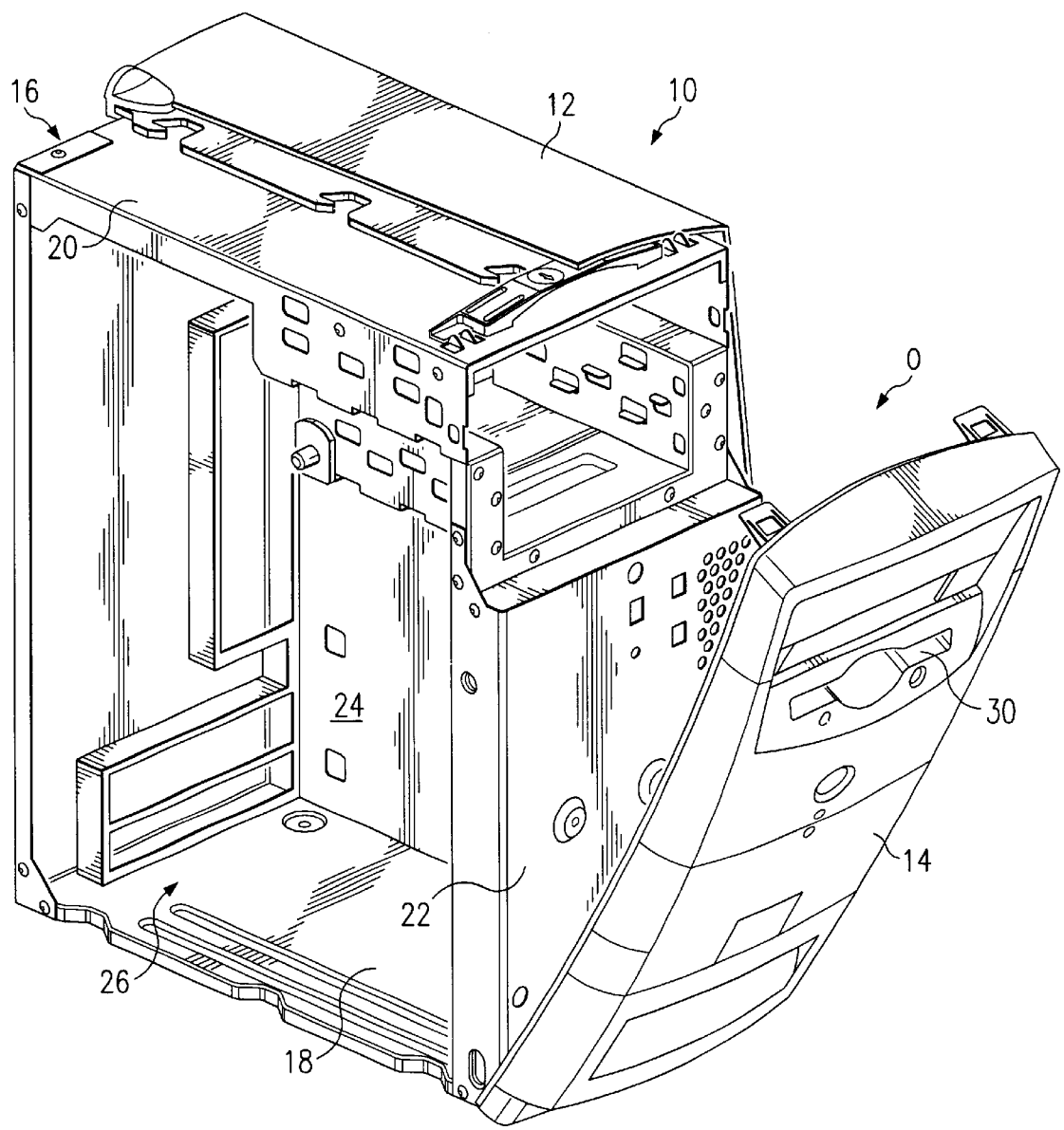
FIG. 2 is a perspective view illustrating an embodiment of the computer with the bezel panel in an open position and a side panel removed.

An embodiment of a computer 10 is illustrated in FIGS. 1 and 2. The computer 10 includes side panels 12 and a bezel panel 14 attached to a chassis 16, FIG. 1. The chassis 16, FIG. 2, includes a base portion 18, a top surface 20, a front wall 22, and a side wall 24. An access opening 26, FIG. 2, is provided to permit access for the assembly and maintenance of system components and peripheral devices mounted within the chassis 16. The chassis 16 is typically made from sheet metal using a process such as sheet metal forming and stamping.

The bezel panel 14 is pivotally attached to the chassis 16 adjacent to the base portion 18, enabling the bezel panel 14 to be moved between a closed position C, FIG. 1, and an open position O, FIG. 2. A peripheral device such as a compact disc drive or a floppy disk drive is mountable in the chassis 16 behind the bezel panel 14. The bezel panel may include an integral bezel 30 or a bezel plate opening for receiving a discrete bezel plate to provide access to the peripheral device when the bezel panel 14 is in the closed position C.

Figure 3:
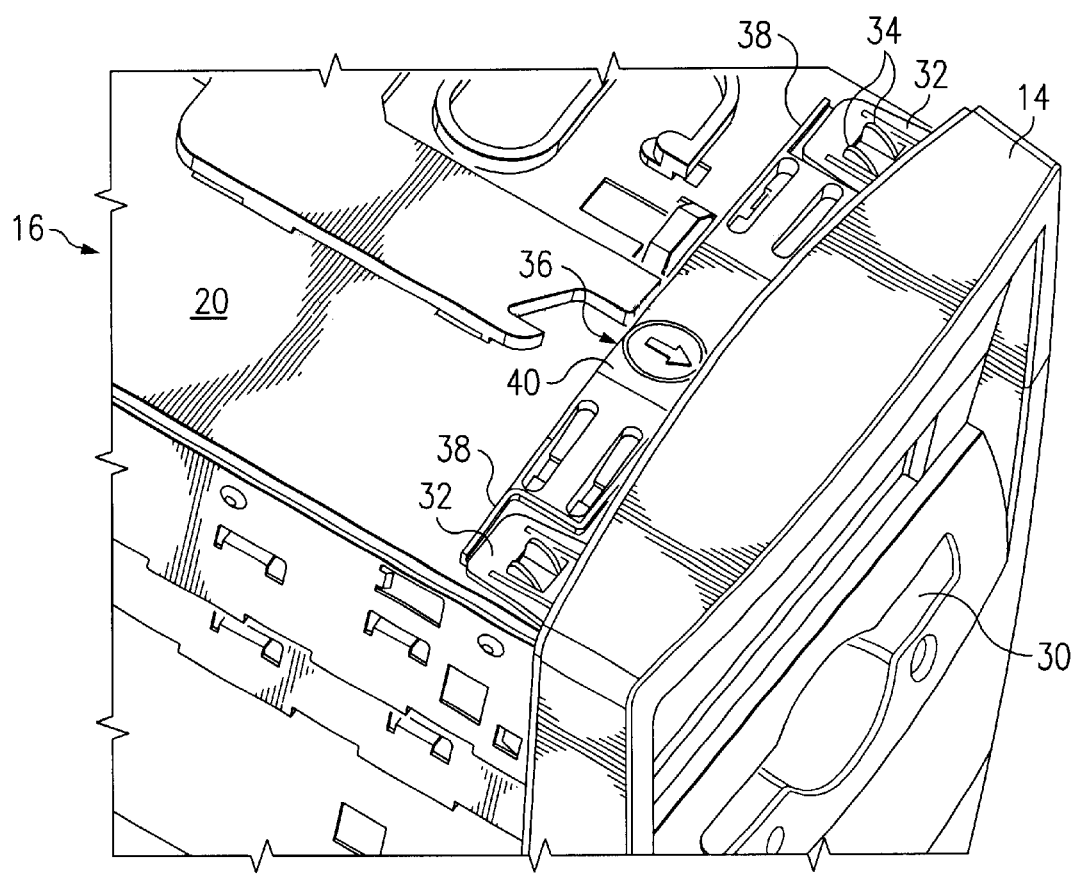
FIG. 3 is a fragmented perspective view illustrating an embodiment of the computer with a release member in a static position.

As illustrated in FIG. 3, two resilient retention members 32 are attached to the bezel panel 14 and two sets of flanges 34 are attached to the chassis 16. Each one of the retention members 32 engages the corresponding set of flanges 34 to secure the bezel panel 14 in the closed position C. A release member 36 is movably mounted on the top surface 20 of the chassis 16 adjacent to the retention members 32. The release member 36 includes two disengagement portions 38 with a flexible beam portion 40 attached between the disengagement portions 38, FIG. 4. Each disengagement portion 38 is positioned between the top surface 20 of the chassis 16 and a corresponding retention member 32, FIG. 3.

Figure 4:
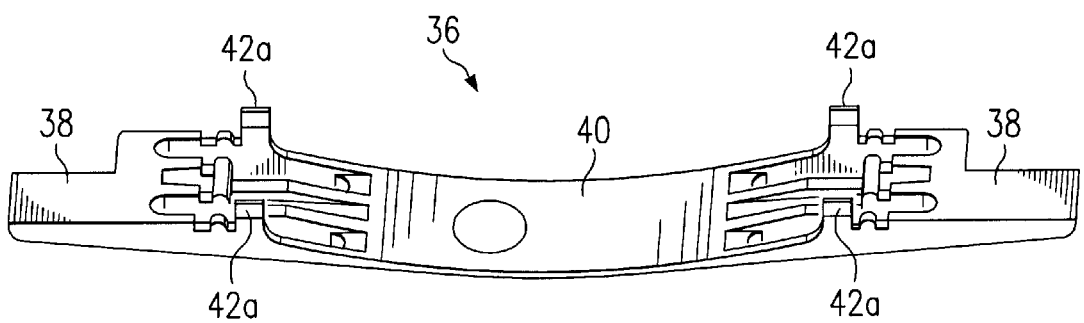
FIG. 4 is a perspective view illustrating an embodiment of the release member.
Figure 5:
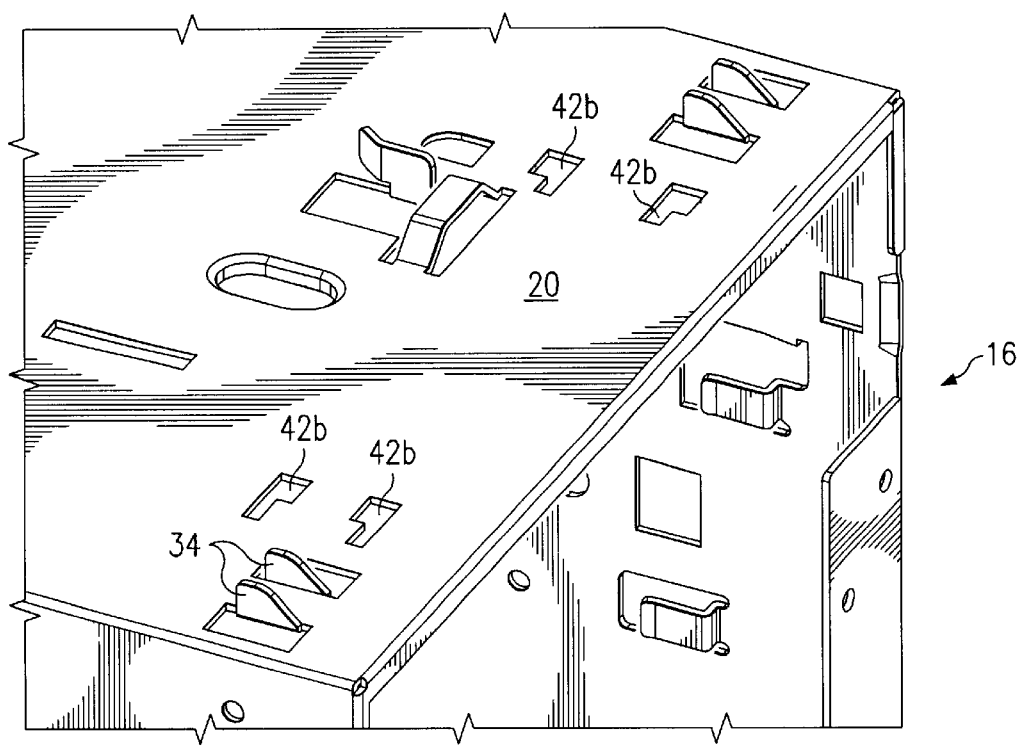
FIG. 5 is a fragmented perspective view illustrating an embodiment of a top surface of a chassis.
Figure 6A:
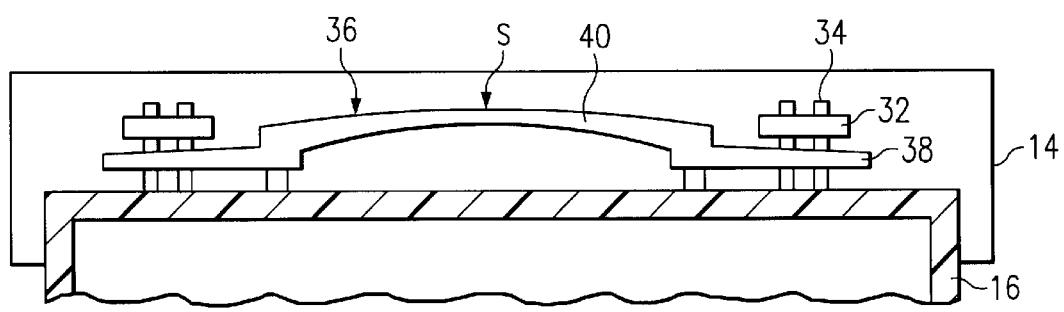
FIG. 6a is a fragmented front view of the computer illustrating an embodiment of the release member in a static position.
Figure 6B:
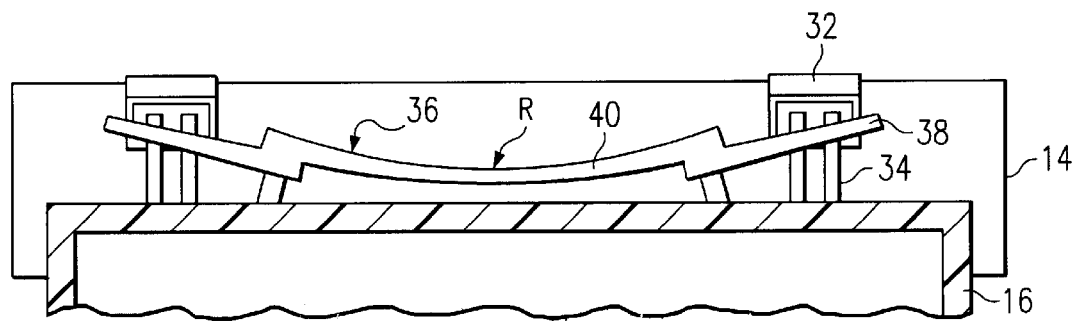
FIG. 6b is a fragmented front view of the computer illustrating an embodiment of the release member in a release position.

The release member 36 includes mounting tabs 42a, FIG. 4, that are movably mounted in slots 42b, FIG. 5, formed in the top surface 20 of the chassis 16. The release member 36 is movable between a static position S, FIG. 6A, and a release position R, FIG. 6B. The flexible beam portion 40 is configured to bias the release member 36 to the static position S. In the static position S, the disengagement portions 38 are positioned such that the retention members 32 engage the corresponding flanges 34 when the bezel panel 14 is in the closed position C. When the release member 36 is moved from the static position S to the release position R, each disengagement portion 38 deflects the adjacent retention member 32, thereby disengaging the retention members 32 from their respective flanges 34 to allow the bezel panel 14 to be moved from the closed position C to the open position O.

Figure 7:
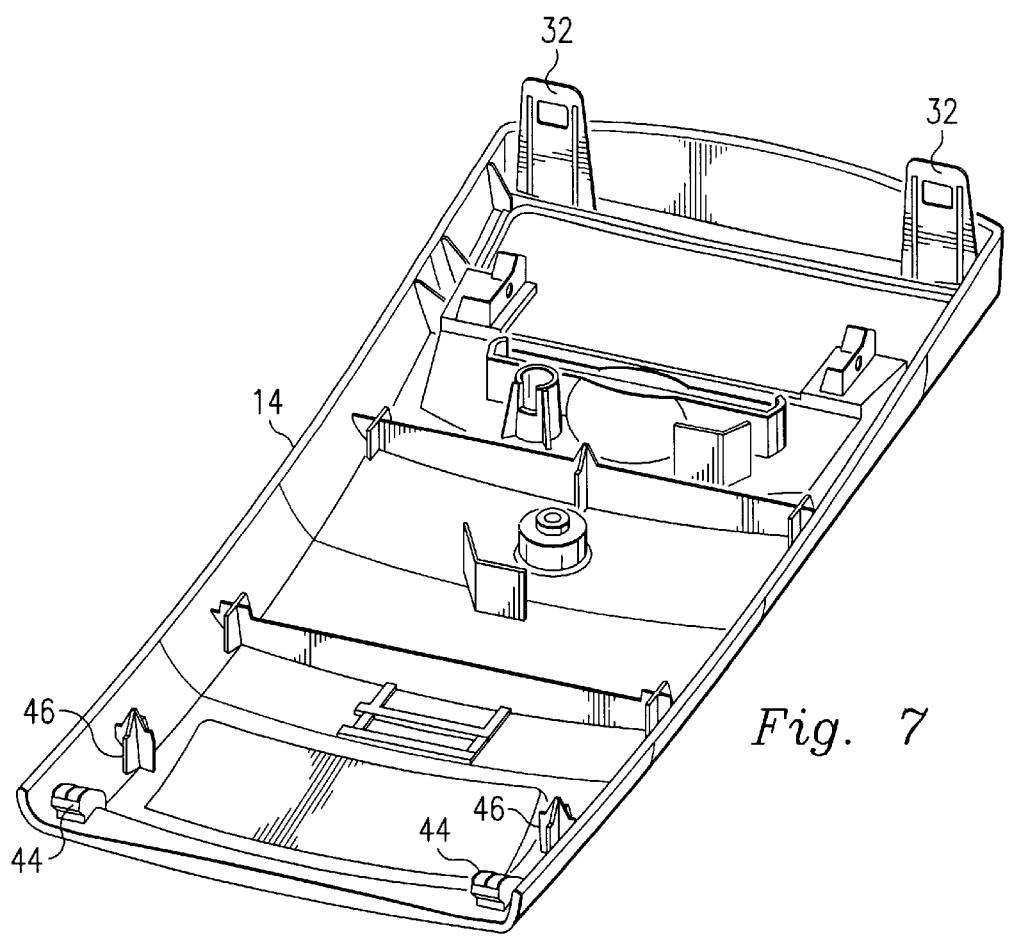
FIG. 7 is a perspective view illustrating an embodiment of the bezel panel.
Figure 8:
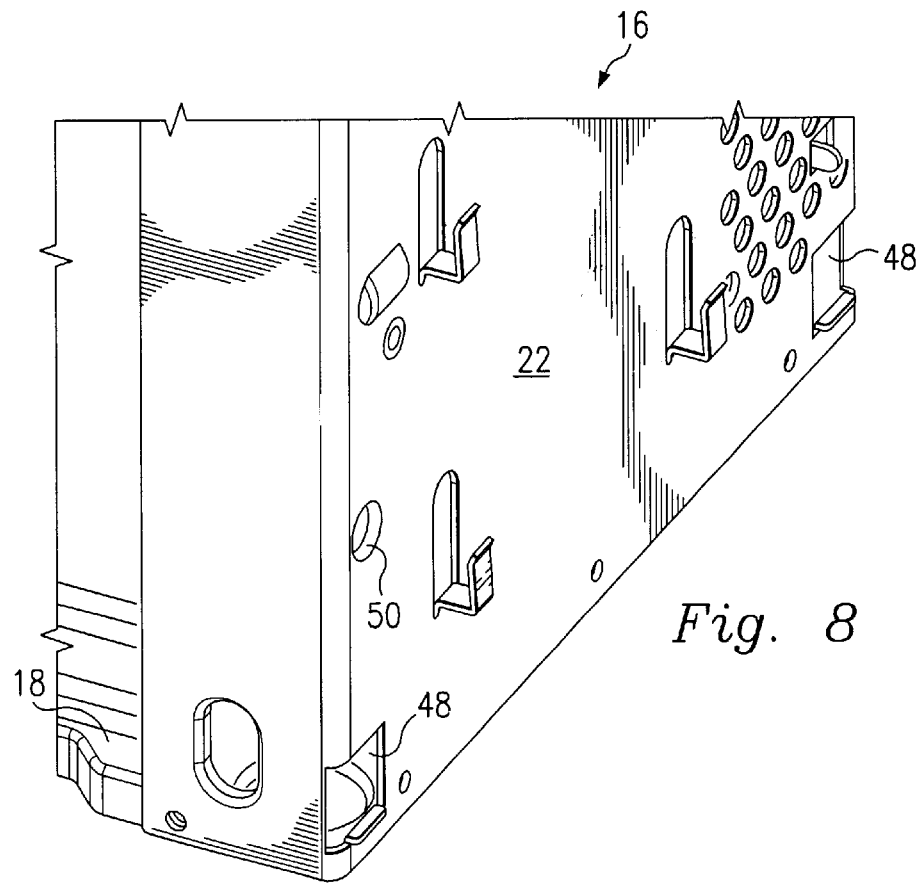
FIG. 8 is a fragmented perspective view illustrating an embodiment of the base portion of the chassis.

FIG. 7 illustrates an embodiment of a bezel panel 14. The retention members 32 are attached to the bezel panel 14 adjacent to a first end thereof. Two retaining members 44 are attached to the bezel panel 14 adjacent to a second end thereof. Two alignment pins 46 are attached to the panel at a position between the retention members 32 and the retaining members 44. Each one of the retaining members 44 is received by an opening 48, FIG. 8, formed in the chassis 16 adjacent to the base portion 18 such that the bezel panel 14 can be pivoted with respect to the chassis 16. Each one of the alignment pins 46 is received by an aperture 50, FIG. 8, when the bezel panel 14 is moved to the closed position C. The alignment pins 46 and apertures 50 are configured such that there is a relatively tight tolerance between the size of the alignment pins 46 and the apertures 50. Due to the tight tolerance, the alignment pins 46 and the apertures 50 provide for reliable and consistent alignment of bezel panel 14 with respect to the chassis 16.

The side panels 12 and the bezel panel 14 may be formed from a polymeric material such as Polycarbonate, Acrylonitrile Butadiene Styrene (commonly known as ABS) or a combination thereof using a process such as injection molding. Furthermore, the bezel panel 14, the retention members 32, the retaining members 44 and alignment pins 46 may be integrally formed. When the bezel panel 14 and the retention members 32 are integrally formed from a polymeric material having suitable flexural characteristics, the retention members 32 may be designed to be resiliently deflectable with respect to the bezel panel 14 to facilitate being engaged with and disengaged from the flanges 34 of the chassis 16.

Figure 9:
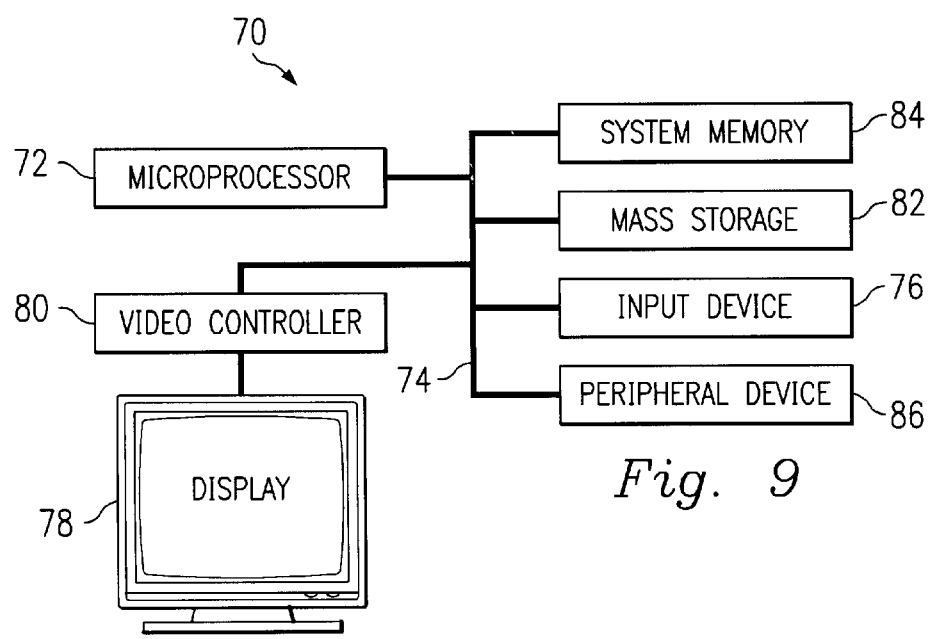
FIG. 9 is a block diagram illustrating an embodiment of a computer system.

An embodiment of a computer system 70 is illustrated in FIG. 9. The computer system 70 includes at least one microprocessor 72. The microprocessor 72 is connected to a bus 74. The bus 74 serves as a connection between the microprocessor 72 and other components of the computer system 70. One or more input devices 76 may be coupled to the microprocessor 72 to provide input to the microprocessor 72. Examples of input devices include keyboards, touchscreens, and pointing devices such as a mouse, a trackball and a trackpad. The computer system 70 may also include a display 78 which is coupled to the microprocessor 72 by a video controller 80. Programs and data are stored on a mass storage device 82 which is coupled to the microprocessor 72. Mass storage devices include components such as hard disks, optical disks, magneto-optical drives, floppy drives, and the like. A system memory 84 provides the microprocessor 72 with fast storage to facilitate execution of computer programs by the microprocessor 72. A peripheral device 86 may be connected to the microprocessor 72 for providing the computer system 70 with additional functionality. Examples of peripheral devices include floppy disk drives, hard disk drives, compact disc players, digital video disc players, memory card readers, and other types of devices. The various components of the computer system are typically mounted in a chassis such as chassis 16, or in an enclosure of a desktop or portable computer. It should be understood that other busses and intermediate circuits can be employed between the components described above and microprocessor 72 to facilitate interconnection between the components and the microprocessor 72.

It is contemplated within the scope of the present disclosure that a single retention member and flange may be employed to accomplish the benefits and advantages of the embodiments presented herein. Similarly, more than two retention members and flanges may be employed as deemed necessary or preferred for providing the benefits and advantages of the embodiments presented herein.

One embodiment provides an apparatus for mounting a panel to a computer chassis. The apparatus includes a release member movably mounted on the chassis and a flange mounted to the chassis. The release member is movable between a static position and a release position. A panel is pivotally attached to the chassis. The panel is movable between a closed position and an open position. A resilient retention member is attached to the panel. The retention member is engaged with the flange when the panel is in the closed position. The release member deflects the retention member from engagement with the flange when the release member is moved from the static position toward the release position to allow the panel to be moved from the closed position to the open position.

Another embodiment provides a computer system including a chassis, a microprocessor mounted in the chassis, an input coupled to provide input to the microprocessor; a mass storage coupled to the microprocessor; and a memory coupled to the microprocessor to provide storage to facilitate execution of computer programs by the microprocessor. A release member is movably mounted on the chassis. The release member is movable between a static position and a release position. A flange is attached to the chassis and a panel is pivotally attached to the chassis. The panel is movable between a closed position and an open position. A resilient retention member is attached to the panel. The retention member engages the flange when the panel is in the closed position. The release member deflects the retention member from engagement with the flange when the release member is moved from the static position toward the release position thereby allowing the panel to be moved from the closed position to the open position.

Another embodiment provides an apparatus for mounting a panel to a computer chassis including a flexible release member movably mounted on the chassis. The release member is movable between a static position and a release position. The release member includes two spaced apart disengagement members with a flexible beam portion attached between the two disengagement members. A flange is attached to the chassis adjacent to each one of the disengagement members. A panel is pivotally attached to a base portion of the chassis and is movable between a closed position and an open position. A pair of spaced apart resilient retention members are attached to the panel. The retention members are engaged with the flanges when the panel is in the closed position. Each disengagement member deflects the corresponding retention member from engagement with the flanges when the release member is moved from the static position toward the release position thereby allowing the panel to be moved from the closed position to the open position.

A further embodiment provides a method of releasably attaching a panel to a chassis. The method includes movably mounting a release member on the chassis for being moved between a static position and a release position; attaching a flange to the chassis adjacent to the release member; resiliently attaching a retention member to the panel and pivotally attaching the panel to the chassis for being moved between a closed position and an open position. In response to the panel being moved to the closed position, the retention member is engaged with the flange. In response to the release member being moved from the static position toward the release position, the retention member deflects the retention member from engagement with the flange to allow the panel to be moved from the closed position to the open position.

As it can be seen, the embodiments presented herein provide several advantages. The panel may be accurately and repeatedly aligned and attached to the chassis of the computer system. The panel is secured in position by a single latch mechanism. The interior contents of the chassis may be inspected without fully removing the panel from the chassis. The latching mechanism is engaged and disengaged with minimal force without the use of tools or having to manipulate fasteners such as screws. The panel is precisely aligned to the chassis.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An apparatus for mounting a panel to a computer chassis, comprising:
   a release member movably mounted on the chassis, the release member being movable between a static position and a release position;
   a flange attached to the chassis;
   a panel pivotally attached to the chassis, the panel being movable between a closed position and an open position;
   a first alignment member attached to the panel and wherein the chassis includes a second alignment member for engagement with the first alignment member; and
   a resilient retention member attached to the panel, the retention member engaged with the flange when the panel is in the closed position, the release member deflecting the retention member from engagement with the flange when the release member is moved from the static position toward the release position thereby allowing the panel to be moved from the closed position to the open position.

2. The apparatus of claim 1 wherein the release member includes a plurality of mounting tabs and wherein the chassis includes a plurality of elongated slots in a top surface thereof, each one of the mounting tabs being mounted in a corresponding one of the slots.

3. The apparatus of claim 1 wherein the release member is mounted to a top surface of the chassis and wherein the panel is pivotally attached adjacent to a base portion of the chassis.

4. The apparatus of claim 1 wherein the panel and the retention member are integrally formed.

5. The apparatus of claim 1 wherein the flange and the chassis are integrally formed.

6. The apparatus of claim 1 wherein the panel is a bezel panel including an opening for providing access to an associated peripheral device mountable in the chassis, the first alignment member and second alignment member being positioned to align the opening with respect to the associated peripheral device.

7. The apparatus of claim 6 further comprising a retaining member attached to the panel, the retaining member being engaged with a base portion of the chassis for enabling the panel to be pivoted between the open position and the closed position.

8. The apparatus of claim 1 further comprising retaining members attached to the panel, the retaining members being engaged with a base portion of the chassis for enabling the panel to be pivoted between the open position and the closed position.

9. The apparatus of claim 8 wherein the panel, the retaining members and the retention members are integrally formed.

10. The apparatus of claim 1 wherein the release member includes a disengagement member positioned adjacent to the retention member and a flexible beam portion attached to the disengagement member, the retention member being deflected by the disengagement member when the flexible beam is moved from the static position to the release position.

11. A computer system, comprising:
  a chassis;
  a microprocessor mounted in the chassis;
  an input coupled to provide input to the microprocessor;
  a mass storage coupled to the microprocessor;
  a memory coupled to the microprocessor to provide storage to facilitate execution of computer programs by the microprocessor;
  a release member movably mounted on the chassis, the release member being movable between a static position and a release position;
  a flange attached to the chassis;
  a panel pivotally attached to the chassis, the panel being movable between a closed position and an open position;
  a first alignment member attached to the panel and wherein the chassis includes a second alignment member for engagement with the first alignment member; and
  a resilient retention member attached to the panel, the retention member engaged with the flange when the panel is in the closed position, the release member deflecting the retention member from engagement with the flange when the release member is moved from the static position toward the release position thereby allowing the panel to be moved from the closed position to the open position.

12. The computer system of claim 11 wherein the release member is mounted to a top surface of the chassis and wherein the panel is pivotally attached adjacent to a base portion of the chassis.

13. The computer system of claim 11 wherein the release member includes a plurality of mounting tabs and wherein the chassis includes a plurality of elongated slots in a top surface thereof, each one of the mounting tabs being mounted in a corresponding one of the slots.

14. The computer system of claim 11 wherein the panel is a bezel panel including an opening for providing access to an associated peripheral device mountable in the chassis, the first alignment member and second alignment member being positioned to align the opening with respect to the associated peripheral device.

15. The computer system of claim 14 further comprising a retaining member attached to the panel, the retaining member being engaged with a base portion of the chassis for enabling the panel to be pivoted between the open position and the closed position.

16. The computer system of claim 11 further comprising retaining members attached to the panel, the retaining members being engaged with a base portion of the chassis for enabling the panel to be pivoted between the open position and the closed position.

17. The computer system of claim 11 wherein the release member includes a disengagement member positioned adjacent to the retention member and a flexible beam portion attached to the disengagement member, the retention member being deflected by the disengagement member when the flexible beam is moved from the static position to the release position.

18. An apparatus for mounting a panel to a computer chassis, comprising:
  a flexible release member movably mounted on a top surface of the chassis, the release member being movable between a static position and a release position, the release member including two spaced apart disengagement members with a flexible beam portion attached between the two disengagement members;
  a flange attached to the chassis adjacent to each one of the disengagement members;
  a panel pivotally attached adjacent to a base portion of the chassis, the panel being movable between a closed position and an open position;
  a first alignment member attached to the panel and wherein the chassis includes a second alignment member for engagement with the first alignment member; and
  a pair of spaced apart resilient retention members attached to the panel, the retention members engaged with a corresponding one of the flanges when the panel is in the closed position, the disengagement members deflecting the retention members from engagement with the flanges when the release member is moved from the static position toward the release position thereby allowing the panel to be moved from the closed position to the open position.

19. A method of releasably attaching a panel to a chassis, comprising the steps of:
  movably mounting a release member on the chassis for being moved between a static position and a release position;
  attaching a flange to the chassis adjacent to the release member;
  attaching a resilient retention member to the panel;
  pivotally attaching the panel to the chassis for being moved between a closed position and an open position;
  providing a first alignment member on the panel;
  providing a second alignment member on the chassis for engagement with the first alignment member;
  in response to the panel being moved to the closed position, engaging the retention member with the flange; and
  in response to the release member being moved from the static position toward the release position, deflecting the retention member from engagement with the flange to allow the panel to be moved from the closed position to the open position.

* * * * *